United States Patent
Brock

(10) Patent No.: US 8,025,234 B2
(45) Date of Patent: Sep. 27, 2011

(54) ARRANGEMENT FOR AND METHOD OF ENHANCING PERFORMANCE OF AN IMAGING READER

(75) Inventor: Christopher Warren Brock, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/288,120

(22) Filed: Oct. 16, 2008

(65) Prior Publication Data

US 2010/0096462 A1  Apr. 22, 2010

(51) Int. Cl.
  *G06K 7/10* (2006.01)
(52) U.S. Cl. .................................................. 235/462.41
(58) Field of Classification Search .................. 235/435, 235/454, 462; 358/426.05, 448, 464, 465, 358/473, 474, 483
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,304,786 A | 4/1994 | Pavlidis et al. | |
| 5,489,769 A * | 2/1996 | Kubo | 235/462.09 |
| 5,703,349 A | 12/1997 | Meyerson et al. | |
| 7,219,841 B2 * | 5/2007 | Biss et al. | 235/462.25 |
| 2002/0050518 A1 * | 5/2002 | Roustaei | 235/454 |
| 2004/0223192 A1 * | 11/2004 | Hiromatsu et al. | 358/474 |
| 2006/0081712 A1 | 4/2006 | Rudeen et al. | |

FOREIGN PATENT DOCUMENTS

EP 1717728 11/2006

OTHER PUBLICATIONS

International Search Report and Written Opinion dated Aug. 26, 2010 in related case PCT/US2009/060444.

* cited by examiner

*Primary Examiner* — Seung Lee
(74) *Attorney, Agent, or Firm* — Nongqiang Fan

(57) ABSTRACT

An arrangement for, and a method of, enhancing performance of an imaging reader for imaging symbols to be read, includes a solid-state imager supported by the reader and having an array of image sensors for capturing return light from a symbol as pixel data over a two-dimensional field of view, an application specific integrated circuit (ASIC) operatively connected to the imager for receiving the pixel data, and a controller operatively connected to the ASIC for mapping the ASIC with at least one virtual scan line, and preferably a plurality of virtual scan lines, each extending over the field of view in an omnidirectional scan pattern. The ASIC is operative for storing the pixel data received by the ASIC that lies on each virtual scan line as stored pixel data. The controller is operative for decoding the stored pixel data on each virtual scan line.

18 Claims, 3 Drawing Sheets

ARRANGEMENT FOR AND METHOD OF ENHANCING PERFORMANCE OF AN IMAGING READER

DESCRIPTION OF THE RELATED ART

Solid-state imaging systems or imaging readers, as well as moving laser beam readers or laser scanners, have both been used to electro-optically read targets, such as one-dimensional bar code symbols, particularly of the Universal Product Code (UPC) type, each having a row of bars and spaces spaced apart along one direction, as well as two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module having a solid-state imager with a sensor array of cells or photosensors, which correspond to image elements or pixels in a two-dimensional field of view of the imager, and an imaging lens assembly for capturing return light scattered and/or reflected from the symbol being imaged, and for projecting the return light onto the sensor array to initiate capture of an image of the symbol as pixel data. The imager may be a one- or two-dimensional charge coupled device (CCD) or a complementary metal oxide semiconductor (CMOS) device and include associated circuits for producing and processing electronic signals corresponding to a one- or two-dimensional array of the pixel data over the field of view. The imager captures the return light under the control of a controller or microprocessor that is operative for processing and decoding the electrical signals into data indicative of the symbol being imaged and read.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Yet, the use of an imaging reader, especially a handheld movable reader, for reading symbols located anywhere within a range of working distances relative to the reader has proven to be challenging. An operator cannot see exactly whether a symbol is within the field of view of the array during reading. It is not uncommon for the operator to repeatedly move the portable reader in multiple side-to-side, up-and-down, and back-and-forth, directions and repeatedly aim the portable reader at a single symbol several times before an indicator advises the operator that the symbol has been successfully imaged and read, thereby slowing down transaction processing and reducing productivity.

Also slowing down transaction processing is the high computational burden imposed on the controller in the imaging reader. The controller in the imaging reader has to process all the pixel data captured over the entire two-dimensional field of view. Even for a field of view having a resolution of 640 pixels×480 pixels, the controller is required to execute about 300 million instructions per second (Mips) in order to achieve an acceptable transaction processing speed considered responsive. By way of comparison, a controller in the aforementioned moving laser beam readers is required to execute about 20-30 Mips in order to achieve an acceptable transaction processing speed, primarily because the controller in the moving laser beam readers is only decoding data derived from light returning from and along actual laser scan lines swept across the symbols being read.

As advantageous as such imaging readers are in capturing images and decoding them into identifying data, it would be desirable to reduce the computational burden imposed on the controllers of such imaging readers and to enhance the responsiveness and reading performance of such imaging readers, especially when reading symbols of high density and located far from the reader.

SUMMARY OF THE INVENTION

One feature of the present invention resides, briefly stated, in an arrangement for enhancing performance of an imaging reader for imaging symbols to be read. The arrangement includes a solid-state imager supported by the reader and having an array of image sensors for capturing return light from a symbol as pixel data over a two-dimensional field of view. Preferably, the imager is a CCD or a CMOS with a rolling or a global shutter. The array may be one-dimensional, i.e., linear arranged along a single row, or two-dimensional having mutually orthogonal multiple rows and columns.

In accordance with this invention, an application specific integrated circuit (ASIC) is operatively connected to the imager, for receiving the pixel data. A controller is operatively connected to the ASIC, for initiating receipt of the data, preferably sequentially as a serial stream, and for mapping the ASIC with at least one virtual scan line, and preferably a plurality of virtual scan lines, each extending over the field of view. Advantageously, the virtual scan lines intersect one another along different directions to constitute an omnidirectional scan pattern covering the field of view. The ASIC is operative for storing the pixel data received by the ASIC that lies on each virtual scan line as stored pixel data. The controller is operative for decoding the stored pixel data on each virtual scan line in real time.

In a preferred embodiment, the ASIC includes a buffer in which the stored pixel data are stored, and the ASIC delivers the stored pixel data from the buffer to the controller. The controller is operative for mapping the ASIC by initializing the ASIC with opposite end point coordinates of each virtual scan line, or with one of the end point coordinates and a slope of the respective virtual scan line.

By connecting the ASIC between the imager and the controller, and by only requiring the controller to decode the stored pixel data on each virtual scan line, rather than all the pixel data over the entire two-dimensional field of view, the computational burden imposed on the controller of the imaging reader of this invention is reduced to about 20-30 Mips, that is, on the same order of magnitude as imposed on the controller in the moving laser beam reader of the prior art. The responsiveness and reading performance of such imaging readers, especially when reading symbols of high density and located far from the reader, are enhanced.

Another feature of the present invention resides in a method of enhancing performance of an imaging reader for imaging symbols to be read. The method is performed by capturing return light from a symbol as pixel data over a two-dimensional field of view of a solid-state imager having an array of image sensors, receiving the pixel data with an application specific integrated circuit (ASIC), mapping the ASIC with at least one virtual scan line that extends over the field of view, storing the pixel data received by the ASIC that lies on the at least one virtual scan line as stored pixel data, and real-time decoding only the stored pixel data.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
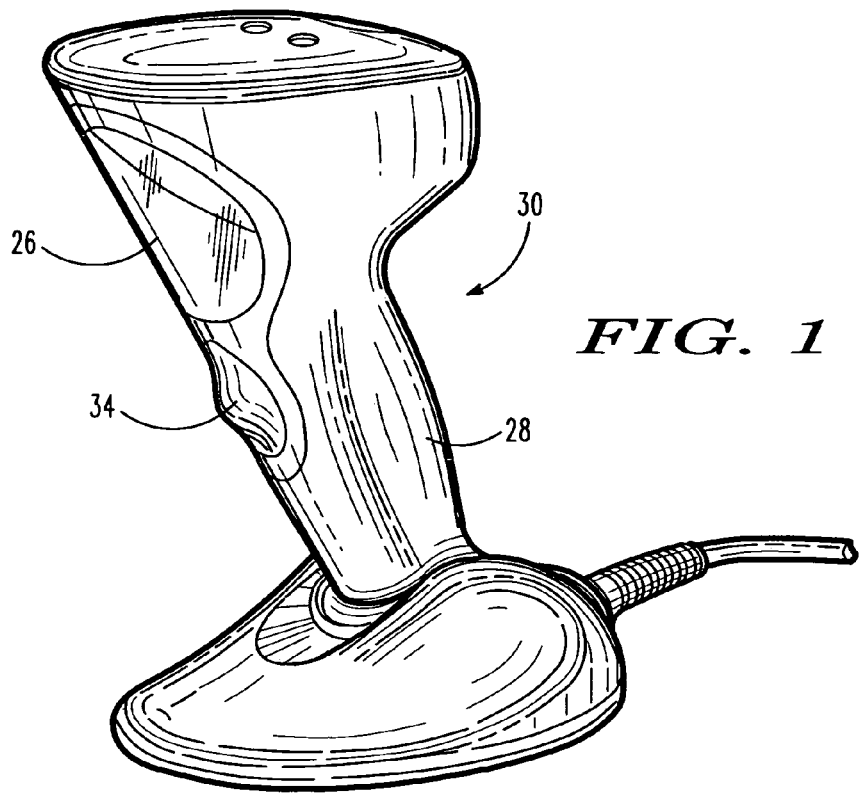
FIG. 1 is a perspective view of a portable imaging reader operative in either a handheld mode, or a hands-free mode, for capturing return light from target symbols.

Reference numeral 30 in FIG. 1 generally identifies an imaging reader having a generally vertical window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the vertical window 26, or can be picked up off the countertop and held in an operator's hand and used in a handheld mode in which the reader is moved, and a trigger 34 is manually depressed to initiate imaging of indicia, especially one- or two-dimensional symbols, to be read at a distance from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
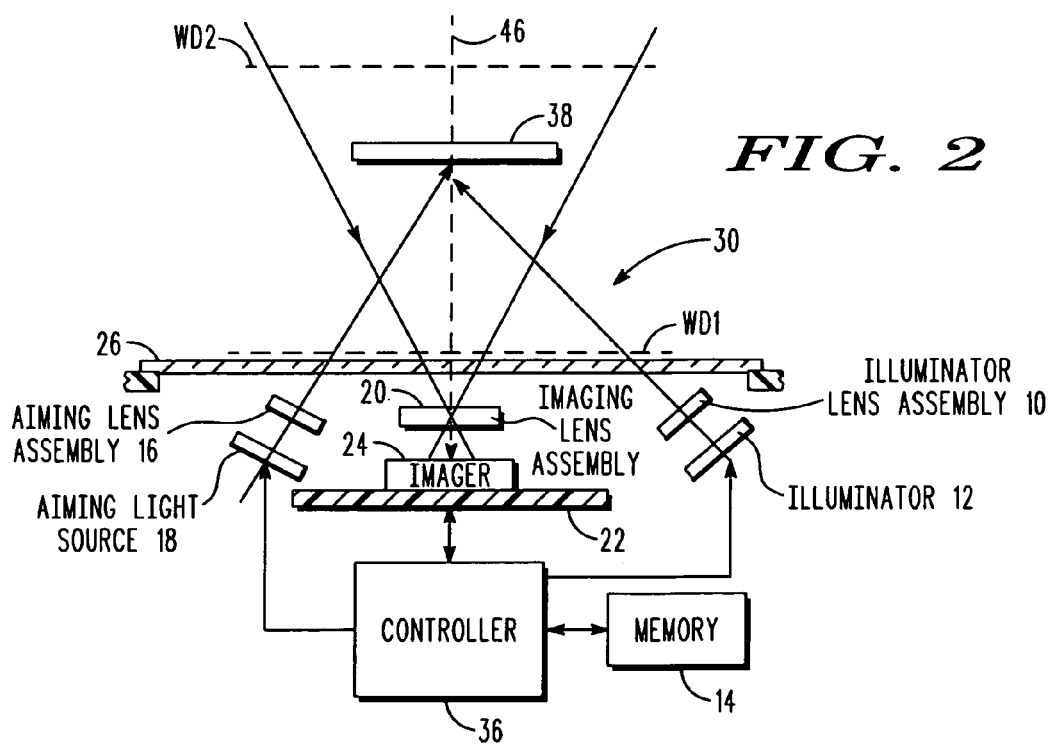
FIG. 2 is a schematic diagram of various components of the reader of FIG. 1.

As schematically shown in FIG. 2, an imager 24 is mounted on a printed circuit board 22 in the reader. The imager 24 is a solid-state device, for example, a CCD a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from a target or symbol 38 as pixel data over a two-dimensional field of view. The imaging lens assembly 20 is operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes an illuminator or illuminating light source 12, e.g., a light emitting diode (LED) or a laser, and an illuminating lens assembly 10 to uniformly illuminate the symbol 38 with an illuminating light having an intensity level over an illumination time period. The light source 12 is preferably pulsed.

An aiming assembly is also mounted in the imaging reader and preferably includes an aiming light source 18, e.g., an LED or a laser, and an aiming lens assembly 16 for generating a visible aiming light pattern on the symbol 38. The aiming pattern is useful to help the operator accurately aim the reader at the symbol 38.

As shown in FIG. 2, the imager 24, the illuminating light source 12 and the aiming light source 18 are operatively connected to a controller or microprocessor 36 operative for controlling the operation of these components. Preferably, the microprocessor 36 includes a decoder for processing the return light from the target symbols, and for decoding the captured target images. A memory 14 is accessible by the controller 36 for storing and retrieving data.

In operation, the controller 36 sends a command signal to energize the aiming light source 18 prior to reading, and also pulses the illuminating light source 12 for the illumination time period, say 500 microseconds or less, and energizes and exposes the imager 24 to collect light, e.g., illumination light and/or ambient light, from the symbol during an exposure time period. A typical array needs about 33 milliseconds to acquire the entire target image and operates at a frame rate of about 30 frames per second.

Figure 3:
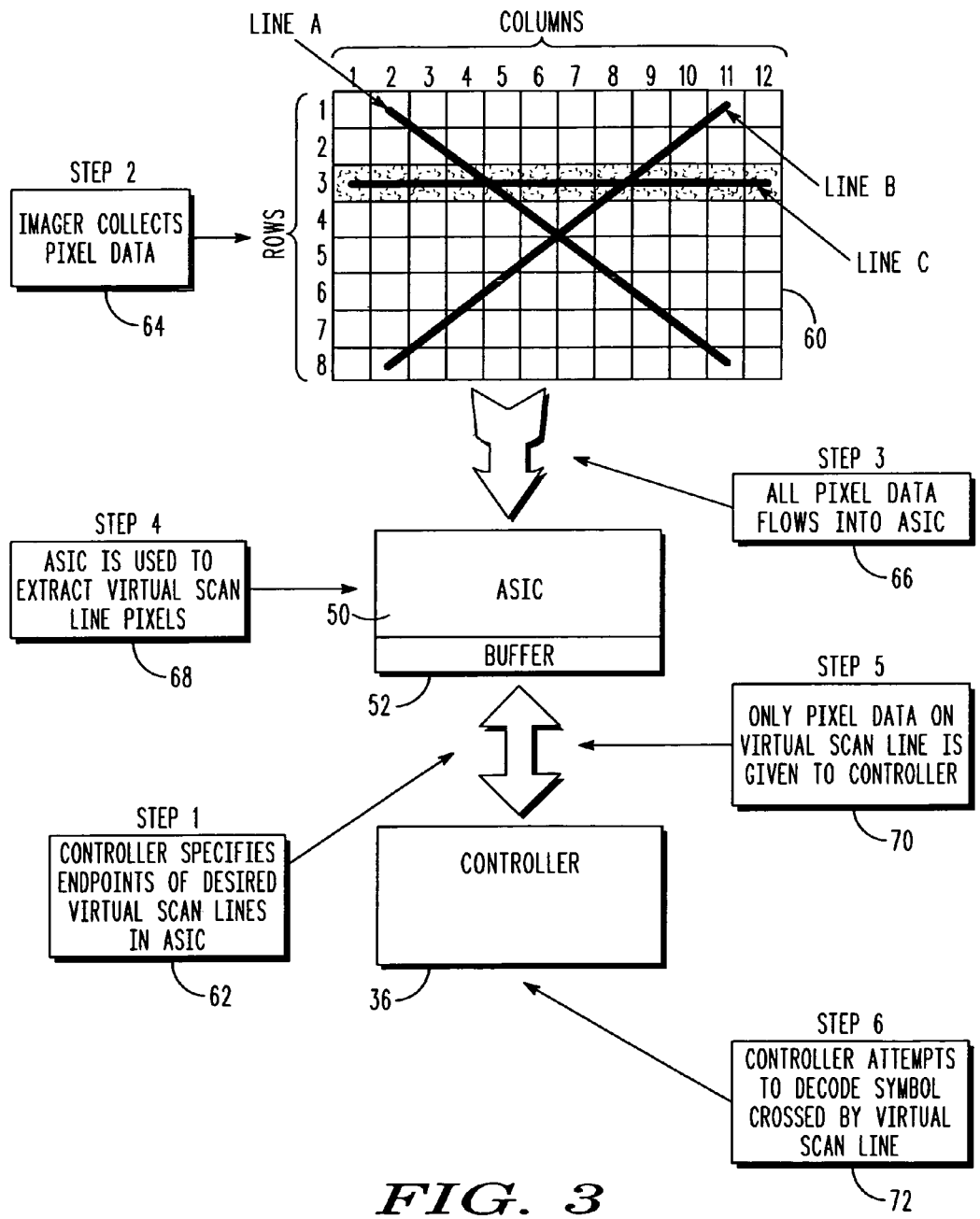
FIG. 3 is a part schematic, part procedural diagram of an arrangement for enhancing performance of the reader of FIG. 1 in accordance with this invention.

In accordance with one feature of this invention, an application specific integrated circuit (ASIC) 50, as shown in FIG. 3, is operatively connected between the imager 24 and the controller 36, for receiving the pixel data. In the prior art, the controller 36 directly received the pixel data. The controller 36 is operatively connected to the ASIC 50, for initiating receipt of the pixel data, preferably sequentially as a serial stream, and for mapping the ASIC 50 with at least one virtual scan line, and preferably a plurality of virtual scan lines A, B, and C, each extending over the field of view 60, as shown in FIG. 3. Advantageously, the virtual scan lines A, B, and C intersect one another along different directions to constitute an omnidirectional scan pattern covering the field of view 60. As explained in further detail below, the ASIC 50 is operative for storing the pixel data received by the ASIC 50 that lies on each virtual scan line A, B, and C as stored pixel data. The controller 36 is operative for decoding the stored pixel data on each virtual scan line A, B, and C in real time.

In a preferred embodiment, the ASIC 50 includes a buffer 52 in which the stored pixel data are stored, and the ASIC 50 delivers the stored pixel data from the buffer 52 to the controller 36. Preferably, each scan line has its own buffer. The controller 36 is operative for mapping the ASIC 50 by initializing the ASIC 50 with opposite end point coordinates of each virtual scan line A, B, and C, or with one of the end point coordinates and a slope of the respective virtual scan line A, B, and C.

By connecting the ASIC 50 between the imager 24 and the controller 36, and by requiring the controller 36 to decode the stored pixel data on each virtual scan line A, B, and C, rather than all the pixel data over the entire two-dimensional field of view 60, the computational burden imposed on the controller 36 of the imaging reader of this invention is reduced to about 20-30 Mips, that is, on the same order of magnitude as imposed on the controller in the moving laser beam reader of the prior art. The responsiveness and reading performance of such imaging readers, especially when reading symbols of high density and located far from the reader, are enhanced.

Referring now to FIG. 3, the field of view 60 has been subdivided into eight horizontal rows 1, 2, . . . 8 and twelve vertical columns 1, 2, . . . 12. This is merely exemplary, because more or less rows and columns could be used to configure the field of view. In step 1 of the method, as indicated by block 62, the controller 36 maps the ASIC 50 with the virtual scan lines A, B, and C by specifying their end point coordinates, or one of the end point coordinates and a slope of the respective scan line. Thus, scan line A has end point coordinates (row 1, column 2) and (row 8, column 11); scan line B has end point coordinates (row 8, column 2) and (row 1, column 11); and scan line C has end point coordinates (row 3, column 1) and (row 3, column 12). Each virtual scan line is thus characterized by these end point coordinates written by the controller 36 to the ASIC 50. More or less virtual scan lines could be used to cover the field of view.

In step 2 of the method, as indicated by block 64, the controller 36 exposes the imager 24, which then captures the pixel data from all the rows and columns. In step 3, as indicated by block 66, all the pixel data is conducted sequentially, column by column, for each row, to the ASIC 50. In step 4, as indicated by block 68, the ASIC 50 tests the row and column of each received pixel to determine if that pixel lies on any of the virtual scan lines A, B, and C. This is done completely in hardware in real time. For example, as shown by stippling across the scan line C in FIG. 3, pixel data was received for all the pixels in row 3. If any pixel is deemed to lie on a particular virtual scan line, then its data is stored in the buffer 52 in the order that it was tested. When all the pixels have been tested, the buffer 52 holds the sequence of the pixel data along each virtual scan line. Thus, the buffer 52 would contain the pixel data for the scan line C in the example illustrated.

In step 5, as indicated by block 70, the buffer 52 delivers the stored pixel data to the controller 36. In step 6, as indicated by block 72, the controller 36 only attempts to decode the stored pixel data, which is then processed as if they had come from a lineal pixel array.

Figure 4:
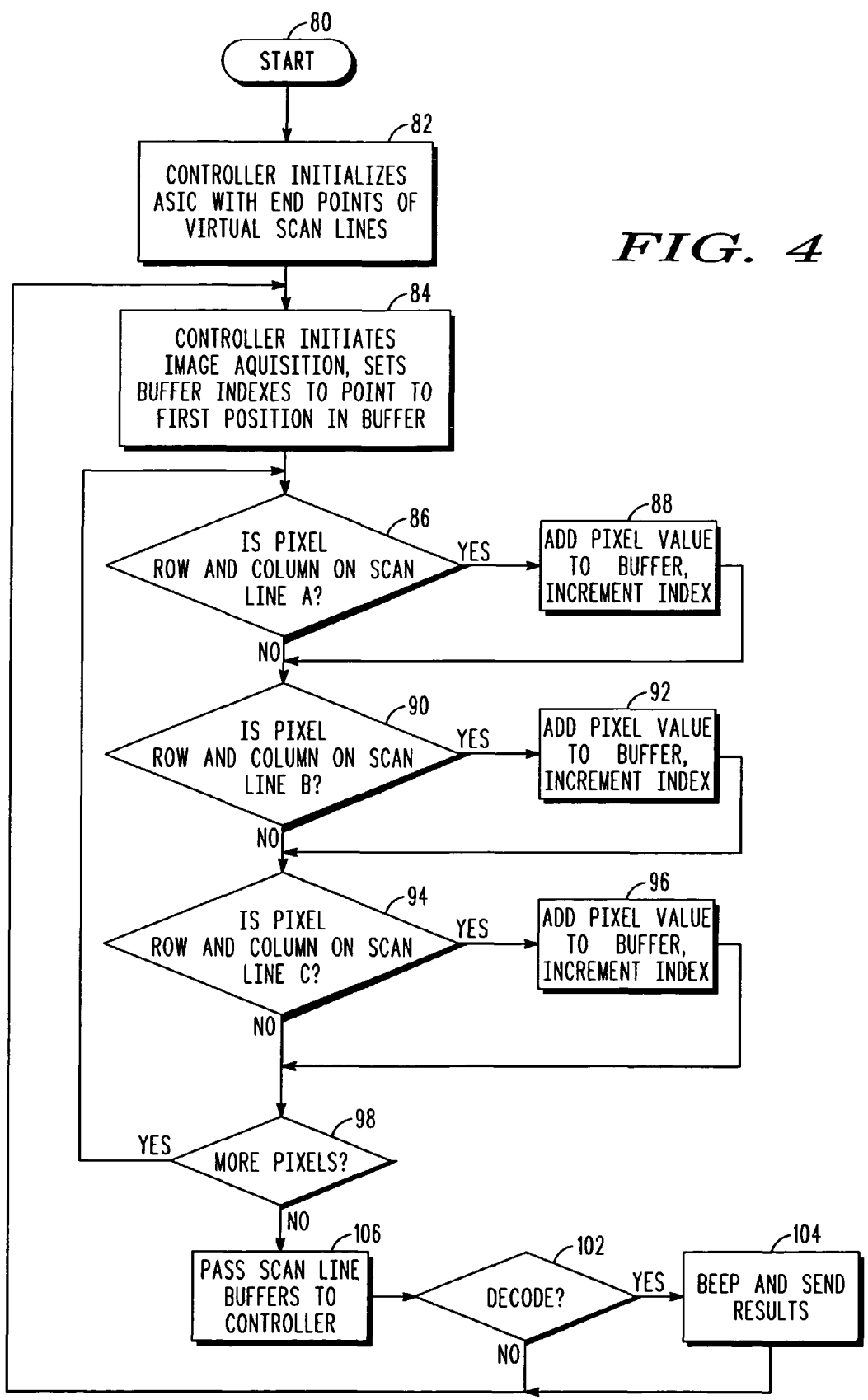
FIG. 4 is a flow chart depicting how performance of the reader of FIG. 1 is enhanced in accordance with this invention.

The method can also be described by means of the flow chart of FIG. 4, in which starting from a start block 80, the controller 36 initializes the ASIC 50 with the end point coordinates of the virtual scan lines A, B, and C (block 82), or one of the end point coordinates and a slope of the virtual scan lines A, B, and C, and initiates image acquisition and sets buffer indexes of each buffer 52 to point to a first buffer position (block 84). If a row and column of a received pixel is on scan line A (block 86), then the data of that pixel is added to the buffer for scan line A, and that buffer index is incremented (block 88). If the row and column of the received pixel is not on scan line A (block 86), or if block 88 has been performed, then the ASIC 50 tests to determine if the row and column of the received pixel is on scan line B (block 90). If so, then the data of that pixel is added to the buffer for scan line B, and that buffer index is incremented (block 92). If the row and column of the received pixel is not on scan line B (block 90), or if block 92 has been performed, then the ASIC 50 tests to determine if the row and column of the received pixel is on scan line C (block 94). If so, then the data of that pixel is added to the buffer for scan line C, and that buffer index is incremented (block 96). If the row and column of the received pixel is not on scan line C (block 90), or if block 96 has been performed, then the ASIC 50 repeats this test for any other scan lines, and then tests the rows and columns of the remaining received pixels (block 98).

When there are no more pixels to test, the contents of the buffers for all the scan lines are passed to the controller 36 (block 100). The controller decodes the stored pixel data (block 102). If successful, then an indicator, such as a light or an auditory beeper, signals a successful decode, and the results of the decoding process are then further processed.

The controller can also configure the ASIC with a virtual scan line that has a specified height perpendicular to the elongation of the scan line. Instead of the scan line having a height of one pixel, it can have an increased height comprised of a plurality of pixels. Pixel data for the plurality of pixels could be averaged, or otherwise processed, for example, for peak detection, thereby providing the virtual scan line with an effective virtual height. This virtual height is analogous to the oval cross section of a laser beam spot employed in moving laser beam readers.

By way of example, for the virtual scan line C that extends along row 3 in FIG. 3, rather than having the buffer store only the pixel data for row 3, the buffer stores the average pixel data for adjacent rows 2 and 4. Thus, the pixel data for (row 3, column 2) will be the average for (row 2, column 2), (row 3, column 2), and (row 4, column 2). This has the effect of stretching the virtual spot perpendicular to the virtual scan line C, thereby improving reading performance for poor quality symbols.

It will be understood that each of the elements described above, or two or more together, also may find a useful application in other types of constructions differing from the types described above.

While the invention has been illustrated and described as an arrangement for, and a method of, enhancing performance of an imaging reader, it is not intended to be limited to the details shown, since various modifications and structural changes may be made without departing in any way from the spirit of the present invention. For example, this invention is not to be limited solely to imaging readers whose only function is to image bar code symbols, but could equally apply to mobile computers or terminals having an imager as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for enhancing performance of an imaging reader for imaging symbols to be read, comprising:
   a solid-state imager supported by the reader and having a two-dimensional array of image sensors for capturing return light from a symbol as pixel data over a two-dimensional field of view;
   an application specific integrated circuit (ASIC) operatively connected to the imager, for receiving the pixel data from the solid-state imager;
   a controller operatively connected to the ASIC, for mapping the ASIC with at least two virtual scan lines that extends over the field of view;
   the ASIC being operative for storing the pixel data from the solid-state imager received by the ASIC that lies on the at least two virtual scan lines as stored pixel data; and
   the controller being operative for decoding the stored pixel data, wherein the controller is operative for performing one-dimensional linear decoding on any barcode symbol crossed by each of the at least two virtual scan lines with the stored pixel data for the corresponding virtual scan line.

2. The arrangement of claim 1, wherein the ASIC includes a buffer in which the stored pixel data are stored, and wherein the ASIC delivers the stored pixel data from the buffer to the controller.

3. The arrangement of claim 1, wherein the controller is operative for mapping the ASIC with additional virtual scan lines each extending over the field of view, wherein the ASIC is operative for storing the pixel data received by the ASIC that lies on each virtual scan line as stored pixel data.

4. The arrangement of claim 3, wherein the virtual scan lines intersect one another along different directions to constitute an omnidirectional scan pattern covering the field of view.

5. The arrangement of claim 1, wherein the controller is operative for mapping the ASIC by initializing the ASIC with at least one set of end point coordinates of the at least one virtual scan line.

6. The arrangement of claim 1, wherein the controller is operatively connected to the imager, for initiating receipt of the pixel data by the ASIC.

7. The arrangement of claim 6, wherein the sensors are arranged in mutually orthogonal rows and columns, and wherein the ASIC sequentially receives the pixel data from the rows and columns as a serial stream.

8. The arrangement of claim 1, wherein the controller is operative for decoding the stored pixel data in real time.

9. The arrangement of claim 1, wherein the ASIC is operative for storing an average of the pixel data received by the ASIC that lies on the at least one virtual scan line and on at least another virtual scan line perpendicular to said at least one virtual scan line.

10. An imaging reader for electro-optically reading a symbol by image capture, comprising:
a mobile handheld housing;
a solid-state imager supported by the housing and having a two-dimensional array of image sensors for capturing return light from the symbol as pixel data over a two-dimensional field of view;
an application specific integrated circuit (ASIC) operatively connected to the imager, for receiving the pixel data from the solid-state imager;
a controller operatively connected to the ASIC, for mapping the ASIC with at least two virtual scan lines that extends over the field of view;
the ASIC being operative for storing the pixel data from the solid-state imager received by the ASIC that lies on the at least two virtual scan lines as stored pixel data; and
the controller being operative for decoding the stored pixel data, wherein the controller is operative for performing one-dimensional linear decoding on any barcode symbol crossed by each of the at least two virtual scan lines with the stored pixel data for the corresponding virtual scan line.

11. A method of enhancing performance of an imaging reader for imaging symbols to be read, comprising the steps of:
capturing return light from a symbol as pixel data over a two-dimensional field of view of a solid-state imager having a two-dimensional array of image sensors;
receiving the pixel data from the solid-state imager with an application specific integrated circuit (ASIC);
mapping the ASIC with at least two virtual scan lines that extends over the field of view;
storing the pixel data from the solid-state imager received by the ASIC that lies on the at least two virtual scan lines as stored pixel data; and
performing one-dimensional linear decoding on any barcode symbol crossed by each of the at least two virtual scan lines with the stored pixel data by decoding the stored pixel data for the corresponding virtual scan line.

12. The method of claim 11, wherein the storing step is performed by storing the stored pixel data in a buffer.

13. The method of claim 11, wherein the mapping step is performed by mapping the ASIC with additional virtual scan lines each extending over the field of view, wherein the storing step is performed by storing the pixel data received by the ASIC that lies on each virtual scan line as stored pixel data.

14. The method of claim 13, and configuring the virtual scan lines to intersect one another along different directions to constitute an omnidirectional scan pattern covering the field of view.

15. The method of claim 11, wherein the mapping step is performed by mapping the ASIC by initializing the ASIC with at least one set of end point coordinates of the at least one virtual scan line.

16. The method of claim 11, wherein the receiving step is performed by sequentially receiving the pixel data as a serial stream.

17. The method of claim 11, wherein the decoding step is performed by decoding the stored pixel data in real time.

18. The method of claim 11, wherein the storing step is performed by storing an average of the pixel data received by the ASIC that lies on the at least one virtual scan line and on at least another virtual scan line perpendicular to said at least one virtual scan line.

* * * * *

UNITED STATES PATENT AND TRADEMARK OFFICE
CERTIFICATE OF CORRECTION

PATENT NO. : 8,025,234 B2  Page 1 of 1
APPLICATION NO. : 12/288120
DATED : September 27, 2011
INVENTOR(S) : Brock It is certified that error appears in the above-identified patent and that said Letters Patent is hereby corrected as shown below:

In Column 3, Line 47, delete "a CCD" and insert -- a CCD or --, therefor.

In Column 5, Line 35, delete "lineal" and insert -- linear --, therefor.

Signed and Sealed this
Eighteenth Day of December, 2012

David J. Kappos
*Director of the United States Patent and Trademark Office*